United States Patent [19]

Harjuhahto

[11] Patent Number: 5,780,564
[45] Date of Patent: Jul. 14, 1998

[54] METHOD OF PREPARING A HOMO- OR COPOLYMER OF VINYL CHLORIDE CONTAINING α-OLEFINS

[75] Inventor: Hannu Harjuhahto, Porvoo, Finland

[73] Assignee: Topvin Oy, Porvoo, Finland

[21] Appl. No.: 612,063

[22] Filed: Mar. 7, 1996

Related U.S. Application Data

[63] Continuation of Ser. No. 256,314, filed as PCT/FI92/00360, Dec. 23, 1992, abandoned.

[30] Foreign Application Priority Data

Dec. 31, 1991 [FI] Finland .................................. 916/90

[51] Int. Cl.⁶ .............................. C08F 2/20; C08F 214/06
[52] U.S. Cl. .............................. 526/201; 526/78; 526/207; 526/202; 526/344.2
[58] Field of Search .................................. 526/201, 202, 526/207

[56] References Cited

U.S. PATENT DOCUMENTS

| | | |
|---|---|---|
| 3,560,462 | 2/1971 | Farber et al. . |
| 3,609,131 | 9/1971 | Lalet . |
| 4,031,299 | 6/1977 | Wei .................................. 526/193 |
| 4,508,863 | 4/1985 | Kauder .................................. 524/591 |

FOREIGN PATENT DOCUMENTS

| | | |
|---|---|---|
| 0309996 | 4/1989 | European Pat. Off. . |
| 5159987 | 5/1976 | Japan . |
| 1220714 | 1/1971 | United Kingdom . |

*Primary Examiner*—Christopher Henderson
*Attorney, Agent, or Firm*—Steinberg, Raskin & Davidson, P.C.

[57] ABSTRACT

The invention relates to a homo- or copolymer of vinyl chloride. The polymer contains 0.01–50% of an oligomer of a $C_4$–$C_{20}$ α-olefin or of an internal olefin or of their mixtures.

6 Claims, No Drawings

METHOD OF PREPARING A HOMO- OR COPOLYMER OF VINYL CHLORIDE CONTAINING α-OLEFINS

This is a continuation of application Ser. No. 08/256,314, filed as PCT/FI92/00360, Dec. 23, 1992, now abandoned.

BACKGROUND OF THE INVENTION

The intenvion relates to a homo- or copolymer of vinyl chloride containing α-olefins.

Polyvinyl chloride (PVC) is pricewise an economical thermoplastic suitable for a large number of applications. In order to make PVC suitable for processing, various additives, such as stabilizers, lubricants, pigments and/or modifiers, are added to the resin obtained in the polymerization. The additives are generally admixed into the PVC polymer afterwards before use.

Methods are also known, wherein, in connection with the PVC polymerization, monomers or polymers improving the properties of the end product or adjusting the polymerization of vinyl chloride are added to the polymerization reactor. Thus, according e.g. to the U.S. Pat. No. 3,560,462, to the vinyl chloride polymerization reactor is added, for preventing the self-acceleration of the polymerization reaction, at least one $C_{10}$–$C_{22}$ α-olefin, which is preferably hexadecene or octadecene. The amount of α-olefin is 0.1–5 weight-%.

In the patent application JP 61155401 is described a suspension polymerization method, wherein 0.1–5 weight-% of $C_6$–$C_{20}$ α-olefin is copolymerized with vinyl chloride. The polymer has a residual monomer content, which is lower than the usual content, and which polymer contains less fish eyes.

In the patent publication U.S. Pat. No. 4,031,299 is described a vinyl chloride suspension polymerization method, wherein a prehomogenized polyallyl compound and an oligomer of propane, preferably a tetramer, are added to the polymerization reactor. The Theological properties can be improved by means of the propylene oligomer.

In the patent application JP 51059987, the vinyl chloride has been polymerized for reducing the amount of fish eyes occurring in the polymer in the presense of a low-molecular-weight polyethylene and an alkane and/or a fatty-acid ester.

SUMMARY OF THE INVENTION

It has been observed according to the invention that improved homo- or copolymers of vinyl chloride are obtained, if the polymer contains α-olefins with a longer carbon chain as oligomers. Thus, the homo- or copolymer of vinyl chloride according to the invention is characterized in that it contains 0.01–50% by weight of an oligomer of a $C_4$–$C_{20}$ α-olefin or of an internal olefin or of their mixtures.

In the inventive vinyl-chloride polymer, the oligomer of the α-olefin apparently acts as an internal lubricant, which decreases or removes the need for using other lubricants or lubricating aids usually applied.

The oligomer may be added into the polymerization reactor before the beginning of the polymerization or later during the polymerization or after the polymerization reaction. In some applications, the oligomer may also be added to the final polymer by admixing, whereby it acts like a conventional lubricant.

When the oligomer according to the invention has been added to the vinyl chloride polymer into the polymerization reactor during the polymerization, it is easily dispersed uniformly in the polymer. This gives good product properties and the processing of the polyvinyl chloride is possible without the addition of other lubricants or it decreases the need for other lubricants. Also, the need for other additives is lower and the mechanical properties of the product are better than those of a PVC prepared in a conventional manner. The polyvinyl chloride prepared according to the invention may be used for the same applications as that prepared with conventional methods.

According to the present invention the oligomer in a homo- or copolymer of vinyl chloride may be prepared from $C_4$–$C_{20}$ α-olefins or internal olefins or their mixtures. Thus, suitable olefins are butenes, pentenes, hexenes, octenes, heptenes, decenes, etc. Extremely suitable are $C_8$–$C_{14}$ α-olefins and especially suitable are decenes, such as 1-decene, 1-dodecene, 1-hexadecene and 1-tetradecene.

The oligomer to be used in the inventive polymers may be a dimer, trimer, tetramer, pentamer or hexamer or their mixture, i.e. the length of the carbon chain may preferably be in the range of $C_{20}$–$C_{100}$. The oligomers may contain reactive double bonds or they may be hydrated. The application of the polymer determines the most suitable oligomer type.

The polymerization is performed by means of any conventional vinyl-chloride polymerization method, but most usually by means of suspension polymerization. The polymerization occurs as a batch process in a reactor provided with a mixer, the contents of which reactor may be heated or cooled with water flowing in the reactor shell. The content of the polymerization mixture is typically as follows: 120–200 parts by weight of water, 100 parts by weight of vinyl chloride monomer, 0.05–0.15 parts by weight of suspending agent and 0.03–0.07 parts by weight of an initiator soluble in vinyl chloride. From the reactor, which contains the other ingredients except for the monomer, air is sucked off and the vinyl chloride is added to the mixture. Because of an effective mixing, it is distributed into the water as small droplets, the diameter of which is 50–150 µm. The suspending agent, such as polyvinyl alcohol, stabilizes the mixture. The polymerization starts in the monomer droplets, when the temperature has been increased to 50° C., whereafter the temperature is adjusted to the desired value (50°–75° C). The batch is transferred into gas-removal and stripping containers. The remaining monomer is removed from the polymer particles by steam stripping. The mixture is centrifugalized and the solid polymer is usually dried by means of a fluidized-bed or drum method.

The molar mass of PVC is adjusted by means of the polymerization temperature. When the temperature increases, the size of the polymer molecules decreases. Similarly, the porosity of the particles depends on the temperature; when the temperature increases, the porosity decreases.

As initiators in the polymerization of vinyl chloride are used azo- or peroxy compounds, such as dicetyl peroxides, peroxide carbonates, alkyl peroxide esters or azodi-isobutyl nitrile. The rate of the polymerization depends on the initiator. E.g. lauryl peroxide and azodi-isobutylnitrile may best be used in higher polymerization temperatures, whereas easily decomposing compounds such as acetyl cyclohexyl sulfonyl peroxide or di-2-ethylhexyl peroxide carbonate may be used in lower temperatures. In many cases, it is prerable to use a mixture of two initiators. The total time of the polymerization is usually 4–10 hours.

As a suspending (disperging) agent is used polyvinyl alcohol or celluloce derivatives, such as methyl-, hydroxyethyl-, hydroxypropyl methyl- or hydroxypropyl celluloce or their mixtures. Part of the dispersing agent is often added later during the polymerization.

The hydrochloric acid formed from the vinyl chloride during the polymerization as well as the acids formed from some initiators are neutralized by bases or buffer compounds, such as sodium or magnesium hydroxide or carbonate.

The necessary additives are admixed with the polymer before the treatment.

For illustrating the invention, the following non-limiting examples are shown.

The laboratory-scale polymerizations were performed in an autoclave type polymerization reactor. Standard methods were used for the analyzation: volume weight: ISO R 60, viscosity number and K value: ISO R 174, and the plastizicer absorption (DOP): ISO 4608.

DETAILED DESCRIPTION OF THE PREFERRED EMBODIMENTS

Examples 1–4

Into the polymerization reactor was added 10 kg of vinyl chloride monomer (VCM), 12 kg of water and as a dispersing agent 0.57 g of polyvinyl alcohol/kg of VCM. 0.7 g of the dispersing agent/kg of VCM was added during the polymerization. As an initiator was used dicetyl peroxide carbonate. The oligomer was added to the polymerization reactor at the start of the polymerization. As an oligomer was used an oligomer, of decene containing double bonds, which oligomer mainly contained trimer ($C_{30}$) and tetramer ($C_{40}$). The polymerization temperature was 57° C. The polymerization tests are shown in Table 1.

TABLE 1

| | Polymerizations | | | |
|---|---|---|---|---|
| Example | Oligomer g/kg of VCM | Initiator g/kg of VCM | Conversion % | Total time of polymerization, min |
| 1 | 10 | 2.0 | 69.6 | 251 |
| 2 | 20 | 2.0 | 57.3 | 357 |
| 3 | 35 | 2.5 | 45.1 | 426 |
| 4 | 100 | 2.5 | 56.5 | 779 |

The properties of the polymer are shown in Table 2.

TABLE 2

| | Resin analyses | | | | |
|---|---|---|---|---|---|
| Example | Volume weight g/l | Granular size D50, μm | K value | Viscosity | DOP % |
| 1 | 575 | 170 | 66.3 | 110 | 20 |
| 2 | 586 | 134 | 65.3 | 107 | 18 |
| 3 | 549 | 139 | 62.6 | 97.0 | 19.7 |
| 4 | 464 | 129 | 54.6 | 72.6 | 26.8 |

Examples 5 and 6

The polymerizations were performed in a similar manner, but as an oligomer was used a hydrated oligomer of decene, which mainly contained tetramer ($C_{40}$), but also trimer ($C_{30}$) and pentamer ($C_{50}$). The amount of initiator was used 1.25 g/kg of VCM. The polymerizations are shown in Table 3 and the resin analyses in Table 4.

TABLE 3

| | Polymerizations | | |
|---|---|---|---|
| Example | Oligomer g/kg of VCM | Conversion % | Polymerization time min |
| 5 | 10 | 67.6 | 261 |
| 6 | 15 | 59.0 | 255 |

TABLE 4

| | Resin analyses | | |
|---|---|---|---|
| Example | Volume weight g/l | Granular size D50, m | DOP % |
| 5 | 557 | 178 | 20.7 |
| 6 | 565 | 162 | 20.5 |

Examples 7–9

Into an autoclave type polymerization reactor was batched 1450 g of vinyl chloride and 1740 g of water. Polyvinyl alcohol dispersing agent was used altogether 1.5 g/kg of VCM. The initiator was dicetyl peroxide carbonate. Oligomer was a hydrated oligomer of decene, which mainly contained tetramer ($C_{40}$) and pentamer ($C_{50}$). The polymerization conditions are shown in Table 5 and the resin analyses in Table 6. Such polyvinyl chloride containing a large amount of oligomer may be used e.g. at a mixing plant for adjusting the lubricating level of a conventional PVC or a PVC containing a low amount of oligomer.

TABLE 5

| | Polymerizations | | | |
|---|---|---|---|---|
| Example | Oligomer g/kg of VCM | Initiator g/kg of VCM | Conversion % | Total time of polymerization, min |
| 7 | 200 | 1.8 | 88.5 | 305 |
| 8 | 300 | 1.8 | 84.1 | 480 |
| 9 | 500 | 1.5 | 78.7 | 480 |

TABLE 6

| | Resin analyses | | |
|---|---|---|---|
| Example | Volume weight g/l | Granular size D50, μm | DOP % |
| 7 | 558 | 125 | 15.8 |
| 8 | 545 | 166 | 16.9 |
| 9 | 470 | 199 | 20.5 |

Examples 10–14

The resins obtained in the polymerizations were prepared into stabilized mixtures. In all examples was used 100 parts by weight of polyvinyl chloride, 1 part of weight of lead sulphate and 0.2 parts of weight of stearic acid. The thermal stability (Congo red) was determined according to the ISO R 182 method and the VICAT softening point by means of the ISO R 306 standard. The MS pressure refers to a gelling test performed by means of the Maclow-Smith plastometer. The results are shown in Table 7.

TABLE 7

| | Properties of mixture | | | |
|---|---|---|---|---|
| Example | Amount of oligomers g/kg of VCM | MS pressure kg/cm$^2$ | Congo red s | VICAT °C. |
| 10 | — | 182 | 100 | 84 |
| 11 | 10 | 161 | 180 | 79 |
| 12 | 20 | 110 | 180 | 78.5 |
| 13 | 30 | 100 | 210 | 77 |
| 14 | 100 | 42 | 280 | 76.5 |

The results clearly indicate that the addition of oligomers considerably improves the thermal stability. The lubrication properties of the oligomer can be seen from the MS pressure, i.e. the processing properties are better than in connection with a conventional PVC.

I claim:

1. A method of preparing a homo- or copolymer of vinyl chloride containing 0.01–50% of a trimer, tetramer or pentamer oligomer of 1-decene, or mixture thereof, comprising adding said oligomer to a polymerization reactor containing vinyl chloride monomer at the beginning of or during the polymerization reaction and polymerizing said vinyl chloride monomer to form a homo- or copolymer of vinyl chloride containing said oligomer.

2. The method of claim 1, wherein said oligomer contains double bonds.

3. The method of claim 2, wherein said double bonds of said oligomer are hydrated.

4. The method of claim 1, wherein said polymer is prepared by means of a suspension polymerization method.

5. The method of claim 1, wherein said oligomer is added to the polymerization reactor at the beginning of the polymerization.

6. The method of claim 1, wherein said oligomer is added to the polymerization reactor during polymerization.

* * * * *